Oct. 13, 1931.  N. L. CAUSAN  1,826,730

RIGID FRAME FOR MOTOR CARS

Filed April 18, 1929  5 Sheets-Sheet 1

INVENTOR
Nemorin Laurent Causan
BY
ATTORNEY.

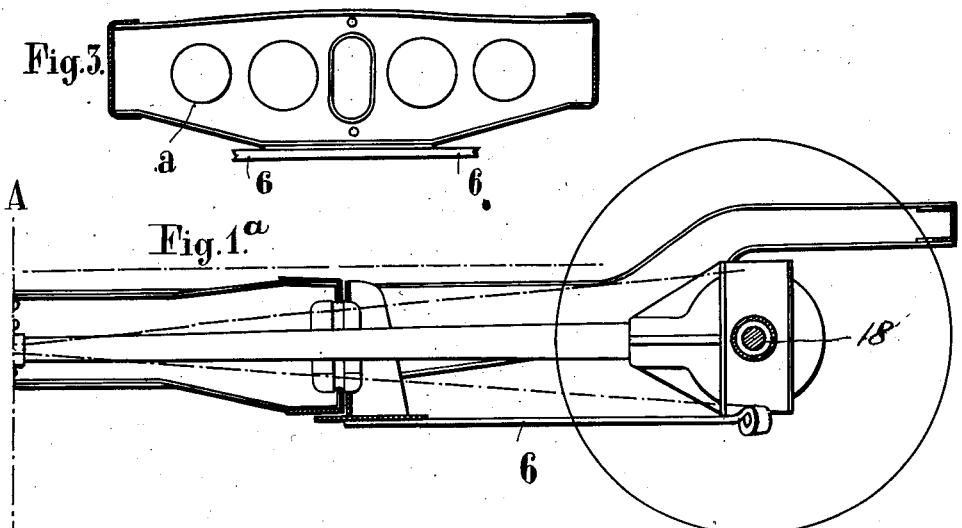
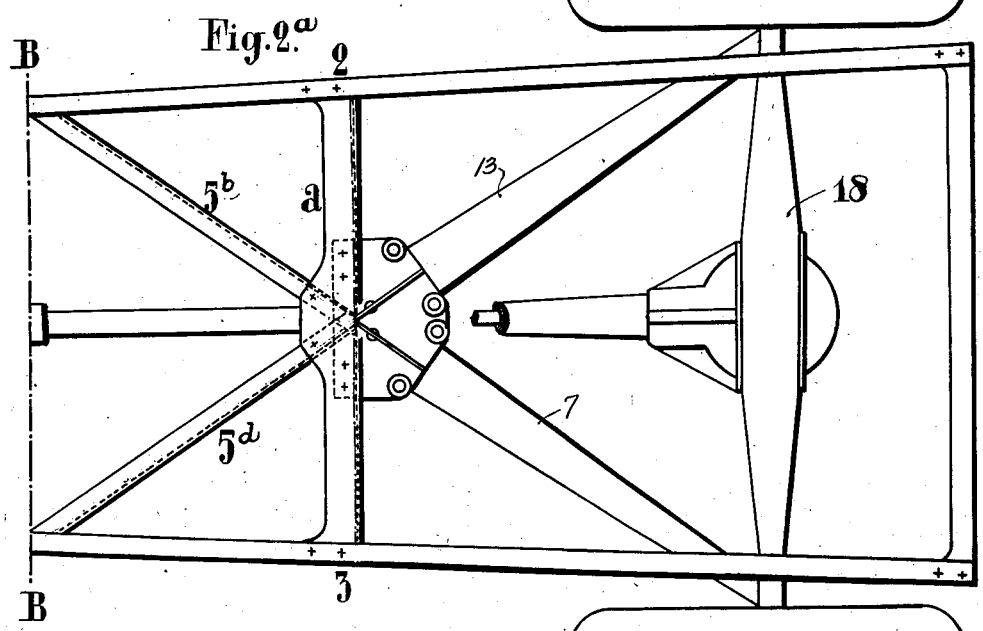

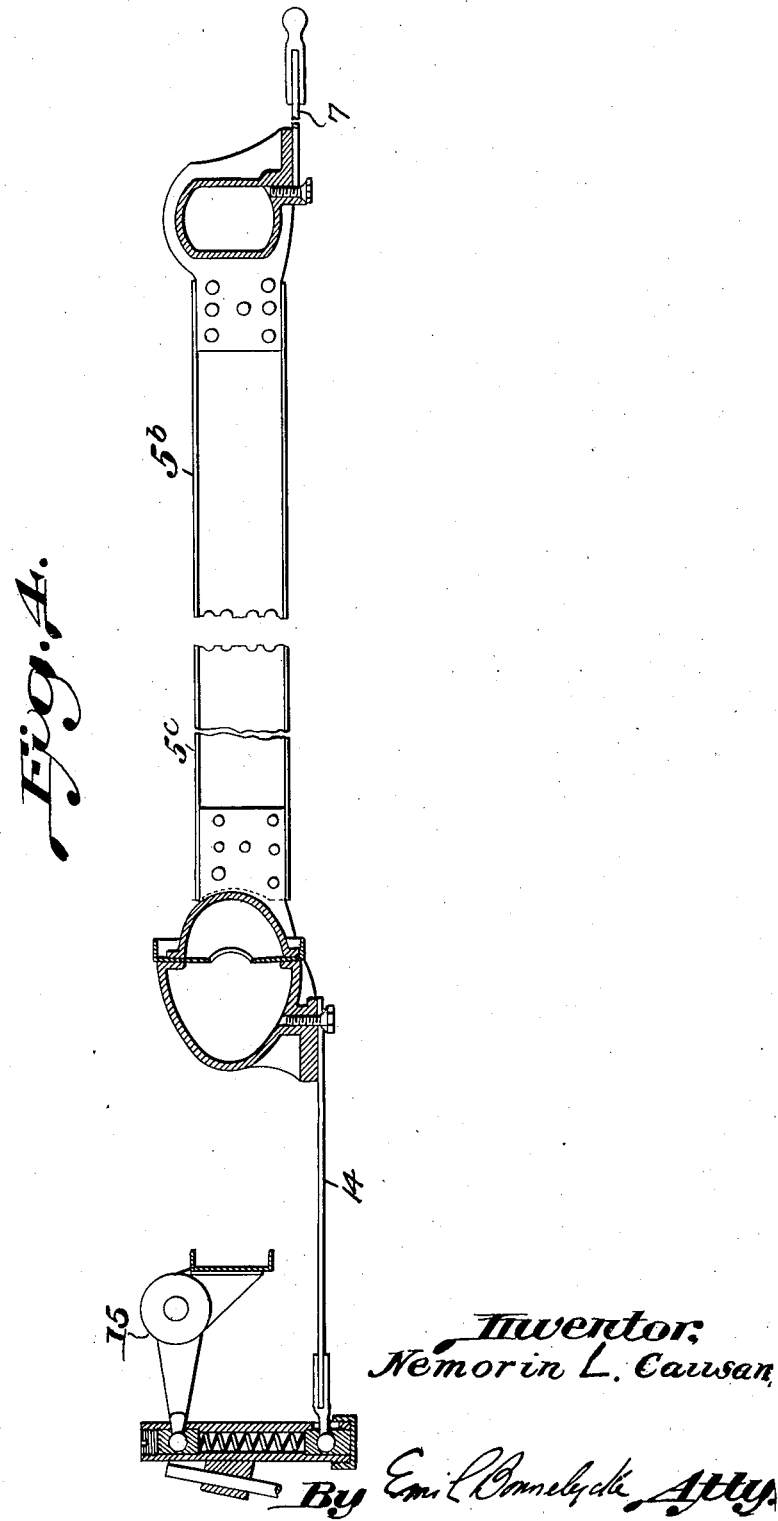

Oct. 13, 1931.   N. L. CAUSAN   1,826,730
RIGID FRAME FOR MOTOR CARS
Filed April 18, 1929    5 Sheets-Sheet 4
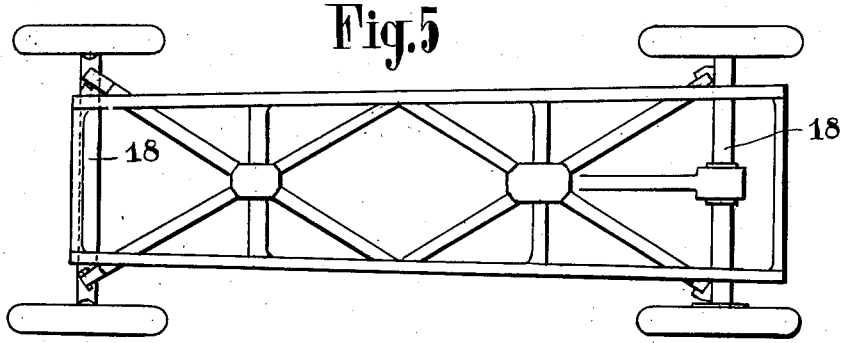
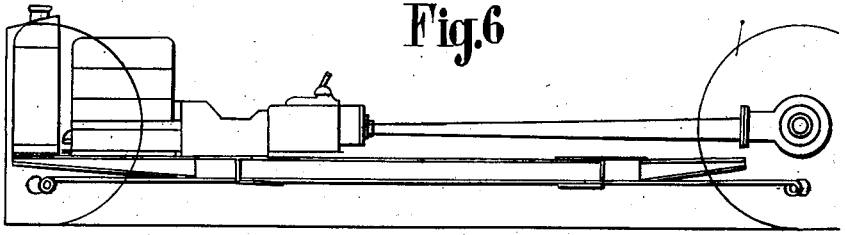
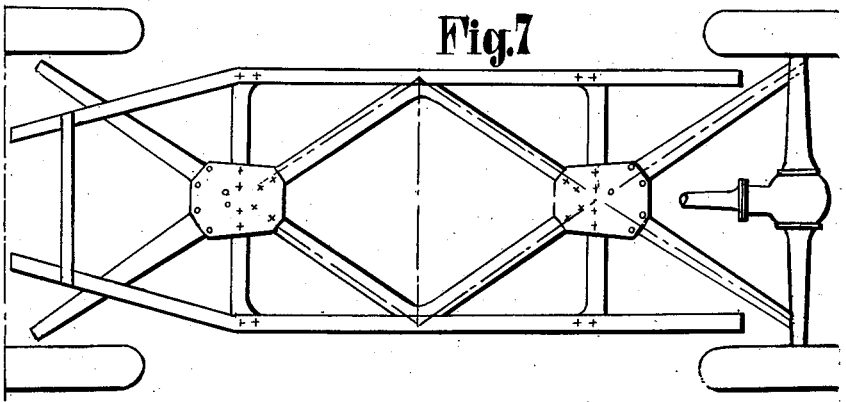

Oct. 13, 1931.  N. L. CAUSAN  1,826,730
RIGID FRAME FOR MOTOR CARS
Filed April 18, 1929  5 Sheets-Sheet 5

INVENTOR:
Nemorin Laurent Causan
BY
ATTORNEY

Patented Oct. 13, 1931

1,826,730

UNITED STATES PATENT OFFICE

NEMORIN LAURENT CAUSAN, OF SURESNES, FRANCE

RIGID FRAME FOR MOTOR CARS

Application filed April 18, 1929, Serial No. 356,235, and in France April 25, 1928.

This invention has for its object a chassis for motor vehicles or the like which will be free from any twisting stresses regardless of conditions of ground unevenness and load distribution upon the wheels.

In the accompanying drawings, various different embodiments of the invention are illustrated:

Figures 1 and 1A jointly represent a side elevation of the preferred embodiment of the invention, and Figs. 2 and 2A a plan view thereof;

Fig. 3 shows a detail of a strut in side elevation;

Fig. 4 represents a vertical section taken through Fig. 2 along the lines 14—5c—5b—7.

Fig. 5 is a plan view of a modification, in which the diagonal struts are extended as far as the opposite side rails;

Figs. 6 and 7 show a lowered chassis, in side elevation and plan view, respectively, which embodies the essential features of the invention.

Figure 1:
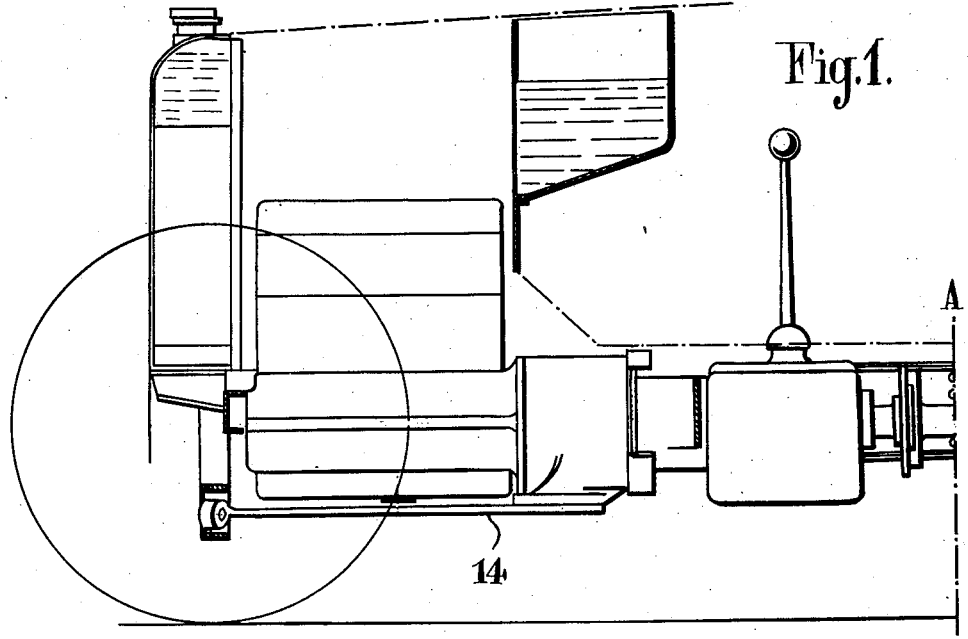
Figure 2:
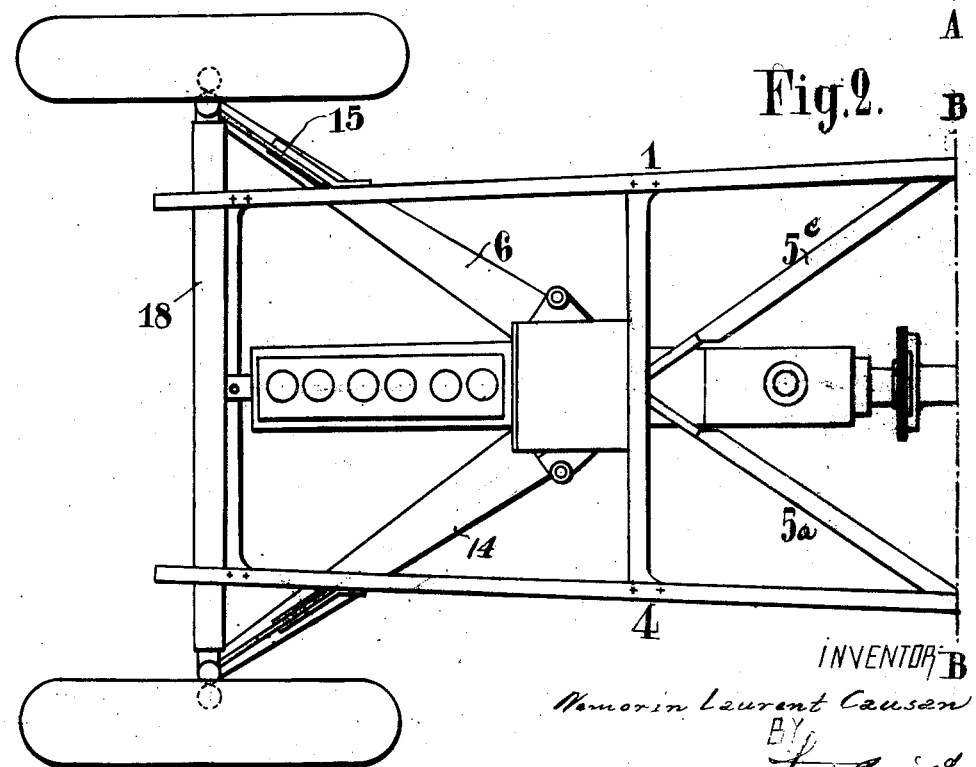
Figure 8:
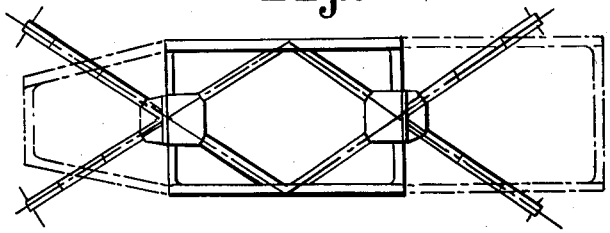
Figs. 8, 9, 10, 11 and 12 show diagrammatically how the principle may be generalized and other embodiments based thereon may be designed.
Figure 9:
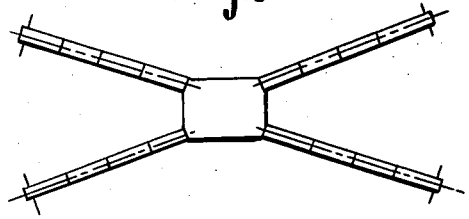
Figure 10:
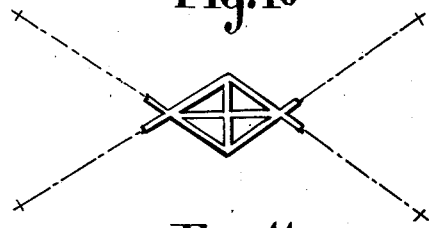
Figure 11:
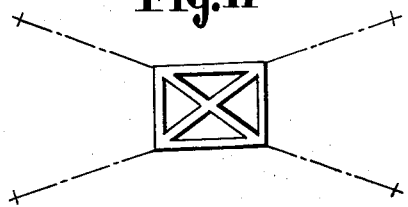
Figure 12:
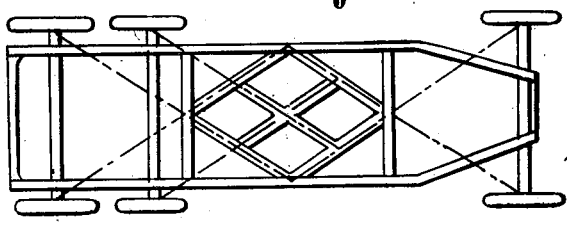

Reference will first be made to Figs. 1 and 2 and related figures: and it may here be stated that where a figure consists of two parts or members, it will be designated by the caption of its left-hand member (Fig. 1, Fig. 2, etc., as the case may be), the remaining part being the "related figure." In the main, however, reference to any one of the compound figures will cover all its parts or members collectively, unless otherwise specified.

Reverting, then, to Figs. 1 and 2, it will be seen that in this embodiment the chassis consists of a central frame 1, 2, 3, 4 of rectangular or slightly trapezoidal form, whereto of the middles 10 and 12 of the two side rails have connected to them the converging outer ends of struts 5a, 5c, 5b, 5d. The suspension springs 14, 6, 13 and 7 (as viewed in plan) are situated, respectively, on prolongations of the lines joining the centers of the sides of the central frame 1, 2, 3, 4.

The primary condition for neutralizing the twisting stresses arising from a defective load distribution upon the wheels, is that the points of attachment of the springs to the axles should lie, when viewed in plan, in prolongations of the lines which connect the centers of the sides of the central frame 1, 2, 3, 4.

To demonstrate that with such an arrangement the non-warpability of the chassis is obtained independently of the rigidity of its component parts, suppose that the chassis is supported solely by the springs 6 and 7. The assemblage of the parts 6 and 5a constitutes a lever whose working points are 8, 9 and 10, so that the chassis sustains at each of the points 9 and 11 a force acting upwardly from bottom to top, and at each of the points 10 and 12 a force acting downwardly from top to bottom.

Supposing, now, that the chassis is supported by the other two springs 13 and 14, it will readily be understood that the forces applied, respectively, at the points 9, 11, 10 and 12 will not change. The frame or body 1, 2, 3, 4 sustaining the same forces applied at the same points, regardless of the distribution of the load on the wheels, is naturally, therefore, non-warpable.

If the points of attachment of the springs on the axles are situated (as seen in plan) only approximately on the prolongations of the struts, it follows that weak torsional stresses are set up which are easily sustained by the rigidity of the structure as a whole. The springs 6, 7, 13 and 14 consist each of a single leaf, in order to facilitate their maintenance.

The suspension shock-absorbers 15 are arranged in the plane of the springs and assist in supporting the axles 18, which latter must have a slight flexibility when torsionally stressed, so as to avoid any binding. Should a shock-absorber or a spring happen to break, then the axle would be supported by the three remaining members, thereby preventing any accident.

I claim as my invention:—

1. A chassis for motor vehicles embodying front and rear axles, and which is inherently non-warpable regardless of the distribution of the load upon the wheels, such chassis comprising a four-sided central frame; struts joining together the middle points of adjacent sides of the frame; and a set of four suspension springs, one individual to each strut carrying said frame and arranged in the vertical planes that pass through the respective struts.

2. A chassis according to claim 1, in which the front axle is slightly flexible when torsionally stressed, and shock-absorbers and springs associated with the same are additionally provided; thereby to enable said axle to be secured at four points, by means of the shock-absorbers and associated springs, to preclude any accident should any one of said securing means happen to break.

In testimony whereof I affix my signature.

NEMORIN LAURENT CAUSAN.